United States Patent
Kozey

(10) Patent No.: US 7,387,320 B2
(45) Date of Patent: Jun. 17, 2008

(54) PRESSURE RELIEF CAP

(75) Inventor: Gregory Kozey, Eastford, CT (US)

(73) Assignee: Kochek Company, Inc., Putnam, CT (US)

(*) Notice: Subject to any disclaimer, the term of this patent is extended or adjusted under 35 U.S.C. 154(b) by 216 days.

(21) Appl. No.: 10/899,412

(22) Filed: Jul. 26, 2004

(65) Prior Publication Data

US 2006/0017288 A1    Jan. 26, 2006

(51) Int. Cl.
    *F16L 17/00*    (2006.01)
(52) U.S. Cl. .............. 285/360; 285/148.19; 285/376; 285/901
(58) Field of Classification Search ........ 285/360–362, 285/376–377, 401–402, 148.19, 148.2, 148.21, 285/901; 138/90, 96 T, 109
See application file for complete search history.

(56) References Cited

U.S. PATENT DOCUMENTS

| | | | | |
|---|---|---|---|---|
| 542,063 | A * | 7/1895 | Mohn | 222/400.7 |
| 791,299 | A * | 5/1905 | Smith | 220/290 |
| 1,019,558 | A * | 3/1912 | Thompson | 285/38 |
| 3,456,463 | A * | 7/1969 | Mihalich | 70/168 |
| 3,840,041 | A * | 10/1974 | McMurray | 137/296 |
| 4,523,778 | A * | 6/1985 | Ebert | 285/73 |
| 4,580,596 | A | 4/1986 | Stehling | |
| 4,602,654 | A | 7/1986 | Stehling et al. | |
| 4,648,630 | A | 3/1987 | Bruch | |
| 6,102,444 | A * | 8/2000 | Kozey | 285/79 |
| 6,102,450 | A | 8/2000 | Harcourt | |
| 6,447,027 | B1 | 9/2002 | Lilley et al. | |
| 6,450,542 | B1 | 9/2002 | McCue | |
| 6,733,045 | B2 * | 5/2004 | Harrington et al. | 285/148.19 |
| 7,128,091 | B2 * | 10/2006 | Istre, Jr. | 137/515.5 |

* cited by examiner

Primary Examiner—Aaron M Dunwody
Assistant Examiner—Fannie C Kee
(74) Attorney, Agent, or Firm—Michaud-Duffy Group, LLP

(57) ABSTRACT

A pressure relief cap for a water supply comprises an outer portion defining a front face for generally covering an outlet of the supply. The outer portion includes a seal for being urged against and sealingly engaging a periphery of the outlet. An inner portion includes a connector for coupling and decoupling to an outlet. The inner portion is rotatably coupled to the outer portion such that upon at least partial rotation of the outer portion in a first direction relative to the inner portion the seal is moved axially inwardly relative to the inner portion from a disengaged position to an engaged position to sealingly engage a periphery of an outlet, and upon at least partial rotation of the outer portion in an opposite direction the seal is moved axially outwardly from the engaged position to the disengaged position to thereby permit back pressure within an outlet to vent.

15 Claims, 7 Drawing Sheets

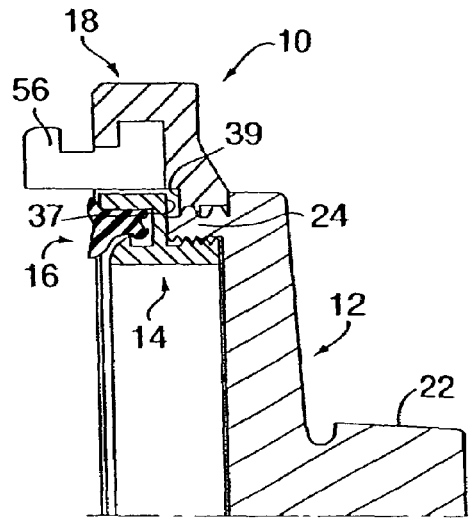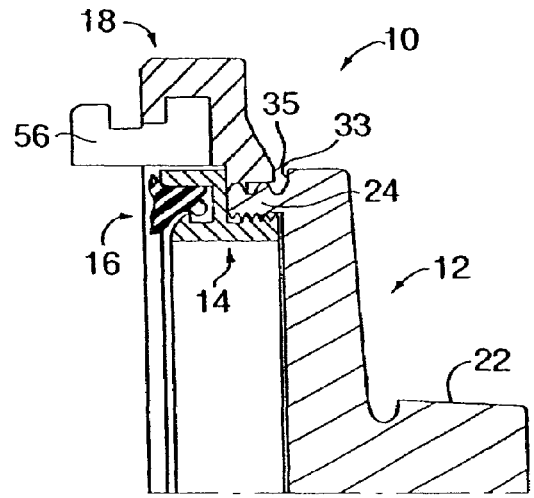
FIG. 7  FIG. 8
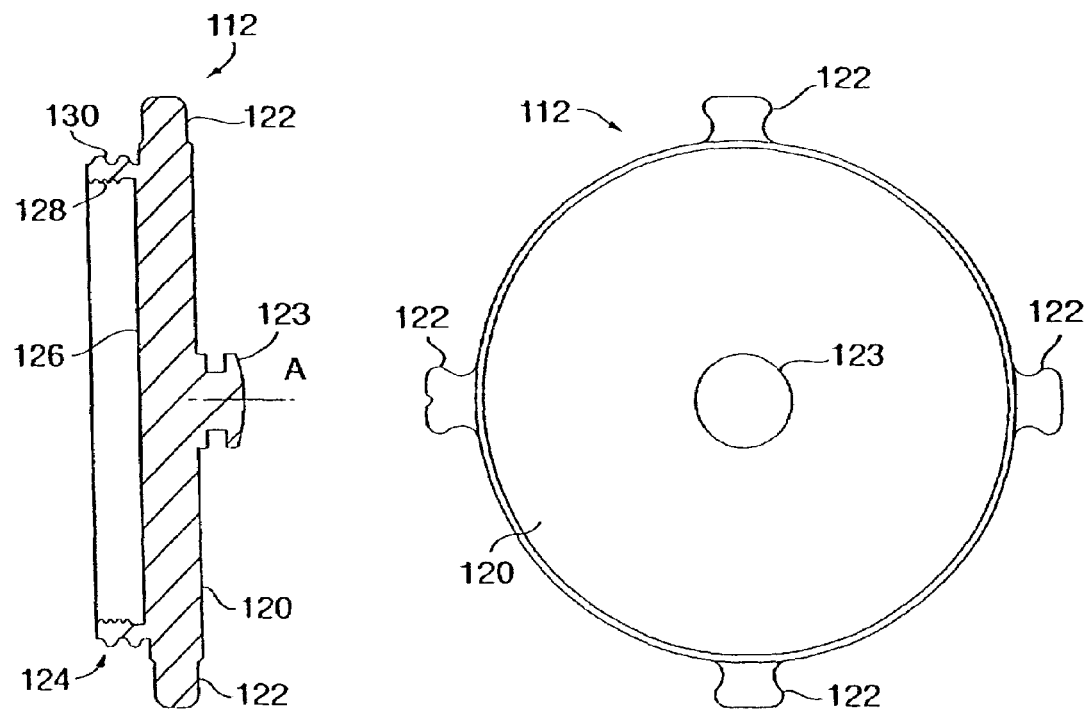
FIG. 11  FIG. 12

US 7,387,320 B2

PRESSURE RELIEF CAP

FIELD OF THE INVENTION

The present invention relates to pressure relief caps for water supply systems, and more particularly relates to a pressure relief cap for an outlet of a water supply such as, for example, a fire hydrant, which safely vents back pressure within the water supply during the removal of the cap from the water supply outlet.

BACKGROUND OF THE INVENTION

Couplings of the Storz type are employed for quick connect and disconnect operations and which are widely used in fire fighting as for example in connecting fire hoses to fire hydrants, pumps and other hoses. Examples of Storz type couplings are found in my U.S. Pat. No. 6,102,444, the disclosure of which is herein incorporated by reference in its entirety. Storz type caps are similar to Storz type couplings, but are used for sealing a fire hydrant connection when the fire hydrant is not in use.

A drawback with prior caps is that any back pressure in the water supply system could potentially cause the cap to blow off an outlet of the water supply while being removed therefrom and thereby injure someone such as, for example, a firefighter when removing a cap from a fire hydrant.

It is therefore a general object of the present invention to provide an improved cap for a water supply which overcomes the drawbacks and disadvantages of prior caps.

SUMMARY OF THE INVENTION

A pressure relief cap for a water supply system in accordance with the present invention comprises an outer portion defining a front face for generally covering an outlet of a water supply such as, for example, a fire hydrant. The outer portion includes a seal for being urged against and sealingly engaging a periphery of the outlet. Preferably, the seal is annular, and the outer portion defines an annular groove for receiving and retaining at least a portion of the seal.

The pressure relief cap further comprises an inner portion including a connector, such as a Storz type connector, for coupling and decoupling to an outlet. The inner portion is rotatably coupled to the outer portion such that upon at least partial rotation of the outer portion in a first direction relative to the inner portion the seal is moved axially inwardly relative to the inner portion from a disengaged position to an engaged position to sealingly engage a periphery of an outlet, and upon at least partial rotation of the outer portion in a second direction opposite to that of the first direction the seal is moved axially outwardly relative to the inner portion from the engaged position to the disengaged position to move the seal away from a periphery of an outlet, and thereby permit any back pressure within an outlet to vent past the seal prior to decoupling the inner portion.

Preferably, the inner portion is threadedly coupled to the outer portion to permit rotation of the outer portion relative to the inner portion. Specifically, the inner portion can define radially inwardly facing threads, and the outer portion can define radially outwardly facing threads for threadedly engaging the radially inwardly facing threads of the inner portion.

In an exemplary embodiment, the outer portion includes a plug member connected to a seal holding member for supporting the seal. The plug member defines the front face, and is rotatably coupled to the inner portion for movement of the seal between the disengaged position and the engaged position. Moreover, the plug member preferably is threadedly engaged with the inner portion for movement of the seal between the disengaged position and the engaged position. For example, the inner portion can define radially inwardly facing threads, and the plug member can define radially outwardly facing threads for threadedly engaging the radially inwardly facing threads of the inner portion.

The outer portion includes at least one projection for facilitating rotation of the outer portion relative to the inner portion. In one aspect of the present invention, the projection extends outwardly from the front face of the outer portion, and defines a shape, such as a pentagon, for being engaged with a correspondingly shaped tool such as a wrench. In a second aspect, the at least one projection includes a plurality of radially outwardly extending handles disposed about a periphery of the outer portion. Specifically, the plurality of handles can each be generally in the shape of a knob or elongated in configuration.

The foregoing and other advantages of the present invention will become more apparent in light of the following detailed description of the exemplary embodiments thereof, as illustrated in the accompanying drawings.

BRIEF DESCRIPTION OF THE DRAWINGS

FIG. 7 is a partial cross-sectional, side elevation view of the pressure relief cap of FIG. 1 in a seal engaged position.

FIG. 8 is a partial cross-sectional, side elevation view of the pressure relief cap of FIG. 1 in a seal disengaged position.

FIG. 11 is a cross-sectional, side elevation view of a plug member of the pressure relief cap of FIG. 10.

FIG. 12 is a front view of the plug member of FIG. 11.

DETAILED DESCRIPTION OF THE PREFERRED EMBODIMENTS

Figure 2:
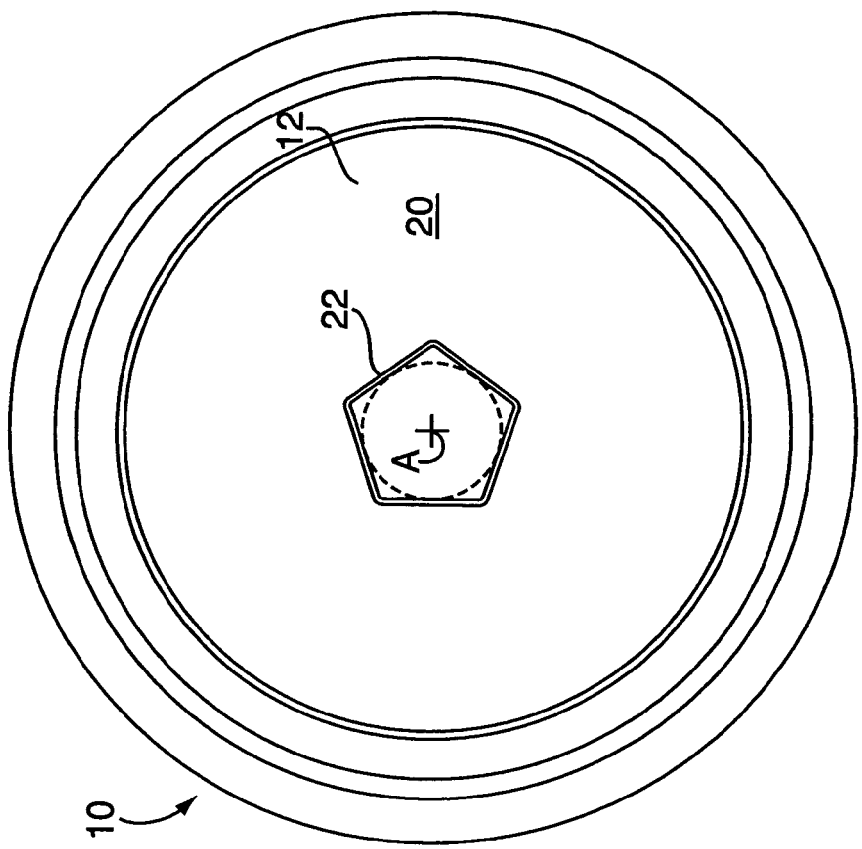
FIG. 2 is an front view of the pressure relief cap of FIG. 1.

With reference to FIGS. 1-8 a generally cylindrical pressure relief cap embodying the present invention is indicated generally by the reference number 10. The pressure relief cap 10 in accordance with the present invention permits someone to relieve back pressure within a water supply system such as, for example, a fire hydrant during the removal of the cap. This pressure relief is achieved during the same motion in which the cap is removed, and not through means of a secondary vent or device. Although the present invention will be explained in connection with relieving back pressure within fire hydrants, it should be understood that the present invention can be employed in other applications for venting potentially dangerous back pressure in a water supply system, and take on other practical shapes without departing from the scope of the present invention.

The pressure relief cap 10 comprises an outer portion including a cylindrical plug member 12 having a central axis A, and a cylindrical seal holding member 14 for supporting an annular seal or gasket 16 thereon. Although the plug member 12 and the seal holding member 14 are shown and described as separate components, such components can be of unitary construction. Moreover, the annular seal 16 can take other practical shapes or configurations without departing from the scope of the present invention.

Figure 9:
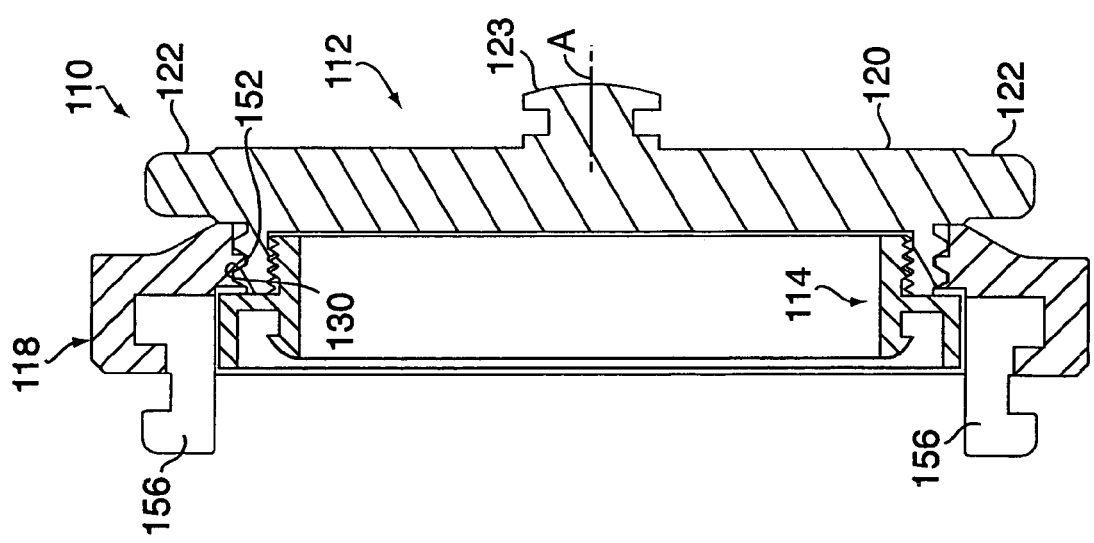
FIG. 9 is a cross-sectional, side elevation view of a pressure relief cap in accordance with a second embodiment of the present invention.

The pressure relief cap further comprises an inner portion including a cylindrical outlet attachment member 18. A front face 20 of the plug member 12 defines a projection or knob 22 disposed on the central axis A and extending axially outwardly from the front face 20 of the plug member 12. The knob 22 is shaped for being received by a correspondingly shaped end of a removal tool such as a wrench. Although the knob 22 is pentagon-shaped as best shown in FIG. 2, the knob may take other practical shapes as shown, for example, in FIGS. 9 and 10, without departing from the scope of the present invention.

Figure 4:
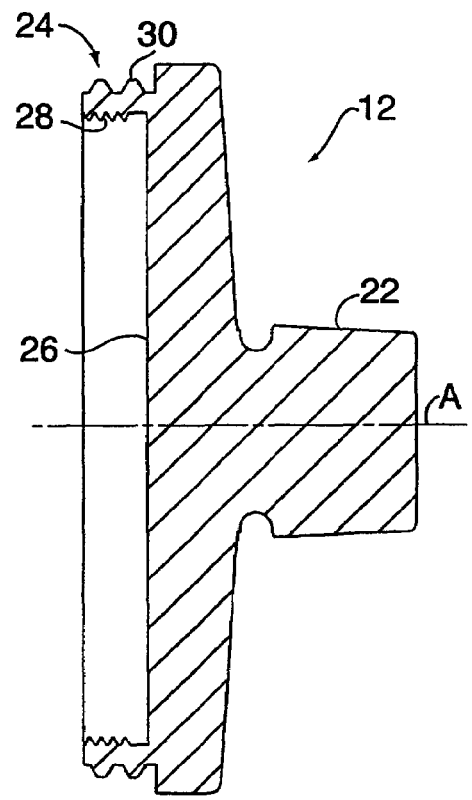
FIG. 4 is a cross-sectional, side elevation view of a plug member of the pressure relief cap of FIG. 1.

As best shown in FIG. 4, the plug member 12 further includes a coupling portion 24 disposed circumaxially about the plug member adjacent to a periphery thereof. The coupling portion 24 extends axially away from an inner face 26 of the plug member 12. The coupling portion 24 defines radially inwardly facing threads 28 and radially outwardly facing threads 30 for engaging other components of the pressure relief cap 10 as explained more fully below.

Figure 1:
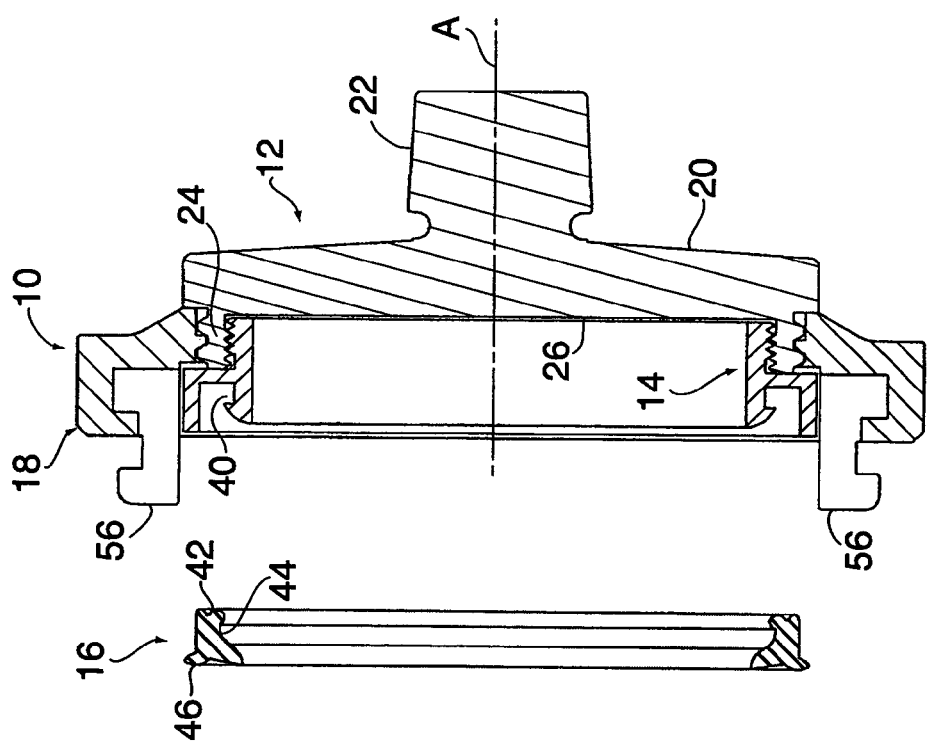
FIG. 1. is a partially exploded, cross-sectional, side elevation view of a pressure relief cap in accordance with the present invention.
Figure 3:
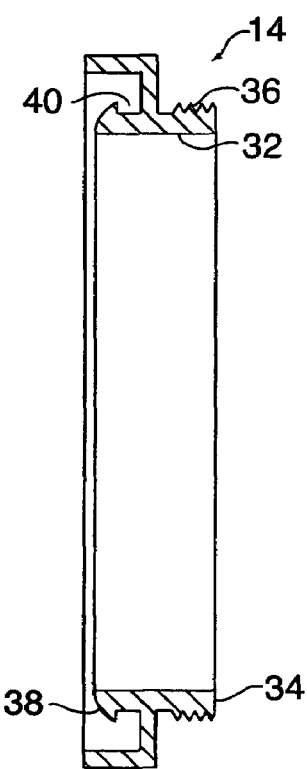
FIG. 3 is a cross-sectional, side elevation view of a seal holding member of the pressure relief cap of FIG. 1.

As best shown in FIG. 3, the seal holding member 14 is cylindrical and includes a coupling portion 32 along an outer axial end 34. The coupling portion 32 preferably defines radially outwardly facing threads 36 for engaging other components of the pressure relief cap 10 as explained more fully below. The seal holding member 14 at an inner axial end 38 defines an open-ended channel or groove 40 for receiving and retaining therein the seal 16. As shown in FIG. 1, the seal 16 has a cross-sectional configuration similar to the cross-sectional configuration of the groove 40 with a radially enlarged end portion 42, a mid portion 44 which is somewhat narrower radially, and a portion 46 forwardly of the mid portion 44 which is somewhat wider than the end portion 42.

Figure 5:
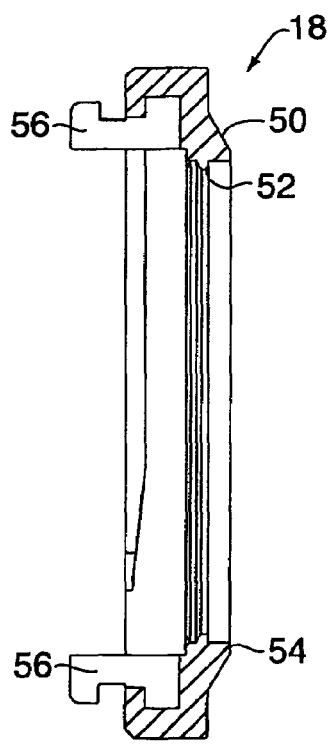
FIG. 5 is a cross-sectional, side elevation view of an outlet attachment member of the pressure relief cap of FIG. 1.
Figure 6:
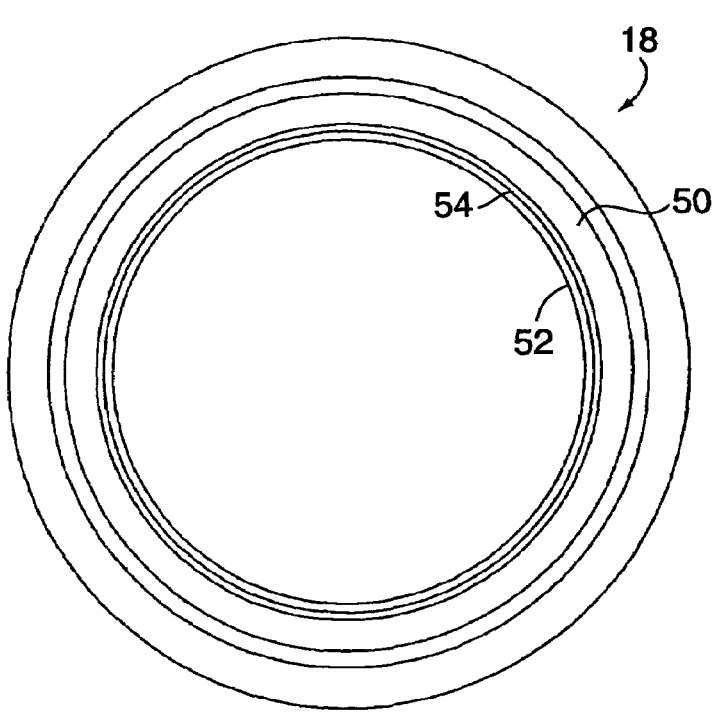
FIG. 6 is a front view of the outlet attachment member of FIG. 5.

As best shown in FIG. 5, the outlet attachment member 18 includes a coupling portion 50 defining radially inwardly facing threads 52 along an outer axial end 54 for engaging other components of the pressure relief cap 10. The coupling portion 50 of the outlet attachment member 18 further includes a connector such as lugs 56 for coupling to an outlet of a water supply system such as a fire hydrant (not shown). As shown in FIGS. 1 and 5, the lugs 56 preferably form part of a Storz type coupling, but may take other practical forms without departing from the scope of the present invention.

During assembly of the pressure relief cap 10, the radially inwardly facing threads 28 of the plug member 12 are threadedly engaged with the radially outwardly facing threads 36 of the seal holding member 14. Preferably, an adhesive such as, for example, LOCTITE®, is applied to one or more of the threads 28, 36 immediately prior to or during assembly in order to permanently secure the seal holding member 14 to the plug member 12 after the adhesive is cured. The radially enlarged end portion 42 of the seal 16 is engaged in the groove 40 defined by the seal holding member 14 to thereby secure the seal to the seal holding member. The radially outwardly facing threads 30 of the plug member 12 are threadedly engaged with the radially inwardly facing threads 52 of the outlet attachment member 18.

With reference to FIGS. 7 and 8, in operation the lugs 56 of the outlet attachment member 18 are axially inserted into an opening of a water supply outlet such as a fire hydrant (not shown). The plug member 12 is then rotated in a clockwise direction with the seal 16 in a disengaged position as shown in FIG. 8. Rotation of the plug member 12 loosely engages the lugs 56 within the opening of the hydrant and causes the outwardly facing threads 30 of the plug member to be threaded along the inwardly facing threads 52 of the outlet attachment member 18 so as to move the plug member and seal holding member 14 coupled thereto axially inwardly relative to the outlet attachment member. As the seal holding member 14 is moved axially inwardly, the seal 16 supported on the seal holding member is also moved axially inwardly from a disengaged position (shown in FIG. 8) to an engaged position (shown in FIG. 7). In the engaged position, the seal 16 is positioned for sealing engagement with a face of the outlet of a hydrant. Upon further rotation of the plug member 12 in a clockwise direction, a surface 33 of the plug member contacts a first stop surface 35 of the outlet attachment member 18 to prevent the radially outwardly facing threads 30 of the plug member from being further threaded onto the radially inwardly facing threads 52 of the outlet attachment member, thereby causing the outlet attachment member to rotate along with the plug member. The rotating outlet attachment member 18 causes the lugs 56 to move into a fully engaged position within the opening of the hydrant to thereby secure the pressure relief cap 10 to the hydrant.

When the pressure relief cap 10 is to be removed from a hydrant or other water supply outlet, the plug member 12 is rotated in a counterclockwise direction. The outwardly facing threads 30 of the plug member 12 are unthreaded along the inwardly facing threads 52 of the outlet attachment member 18 so as to move the plug member and the seal holding member 14 coupled thereto axially outwardly relative to the outlet attachment member. As the seal holding member 14 is moved axially outwardly, the seal 16 supported on the seal holding member is also moved axially outwardly from an engaged position (shown in FIG. 7) to a disengaged position (shown in FIG. 8). In the disengaged position, the seal 16 is positioned to be spaced from and no longer in sealing engagement with a face of the outlet of a hydrant. As a result, any back pressure within a hydrant is allowed to escape past the seal 16 while the lugs 56 are still in the fully engaged position within the opening of the hydrant. Because any venting takes place while the outlet attachment member 18 is secured to the outlet of the hydrant, the dangerous possibility of back pressure causing the pressure relief cap 10 to blow off the hydrant and injure someone is eliminated. Upon further rotation of the plug member 12 in a counterclockwise direction, a surface 37 of the seal holding member 14 contacts a second stop surface 39 of the outlet attachment member 18 to prevent the radially outwardly facing threads 30 of the plug member 12 from being further unthreaded along the radially inwardly facing threads 52 of the outlet attachment member, thereby causing the outlet attachment member to rotate along with the plug member. The rotating outlet attachment member 18 causes the lugs 56 to move from an engaged position within the opening of a hydrant to a disengaged position to thereby permit the pressure relief cap 10 to be safely removed from the hydrant after the back pressure has been vented.

With reference to FIGS. 9-14, a pressure relief cap in accordance with a second embodiment of the present invention is indicated generally by the reference number 110. Like elements with the pressure relief cap 10 shown in FIGS. 1-8 are indicated by like reference numbers preceded by "1".

Figure 10:
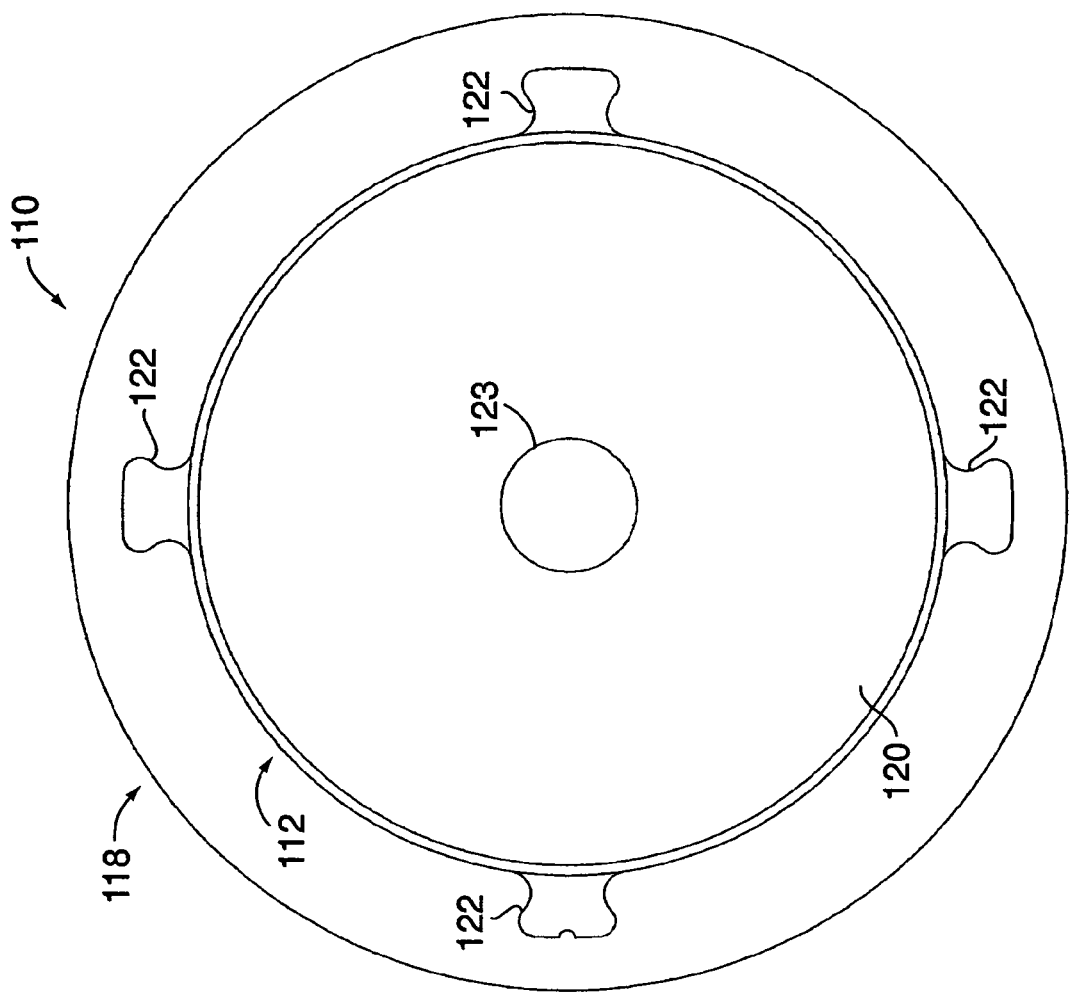
FIG. 10 is a front view of the pressure relief cap of FIG. 9.
Figure 16:
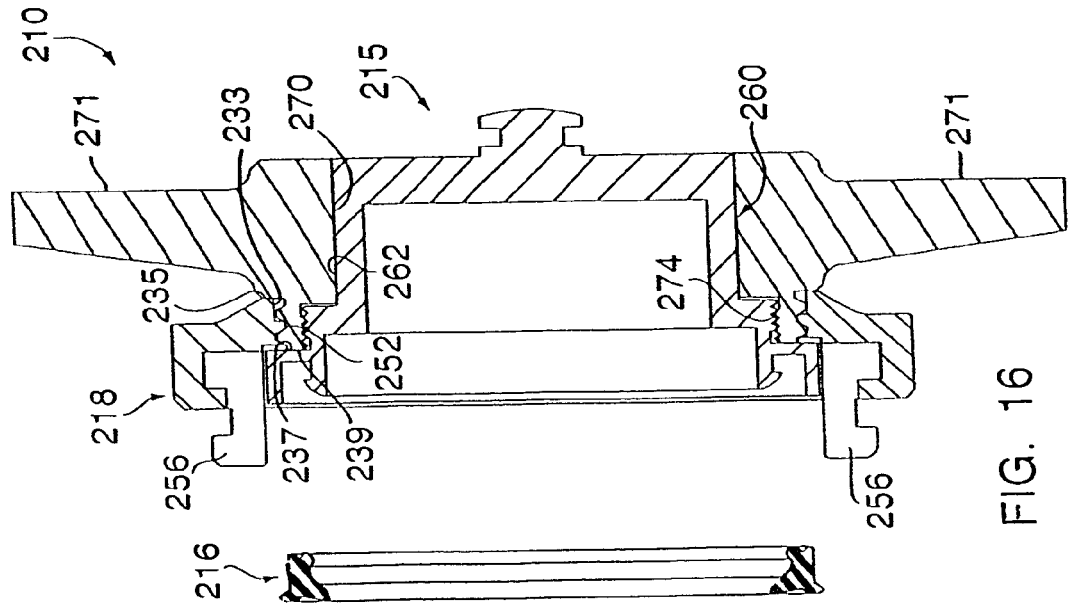
FIG. 16 is a cross-sectional, side elevation view of the combined seal holding and plug member of FIG. 15 with a handle member attached thereto.
Figure 18:
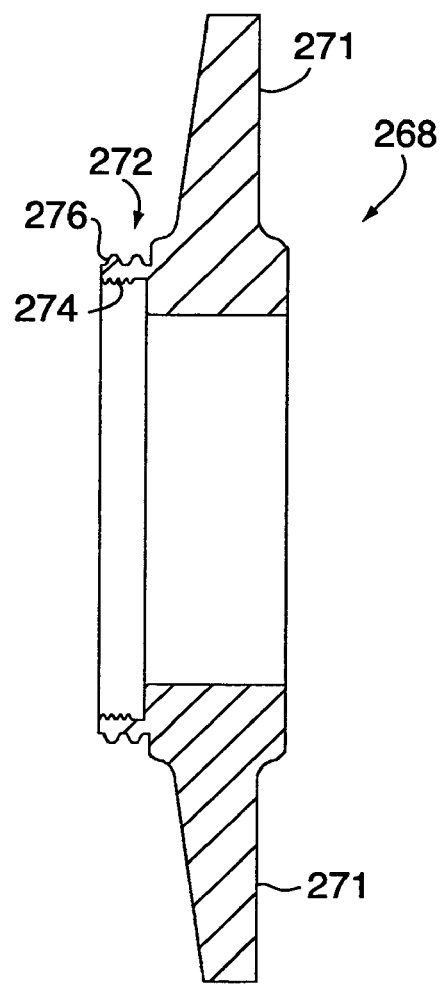
FIG. 18 is a cross-sectional, side elevation view of the handle member of FIG. 16.
Figure 19:
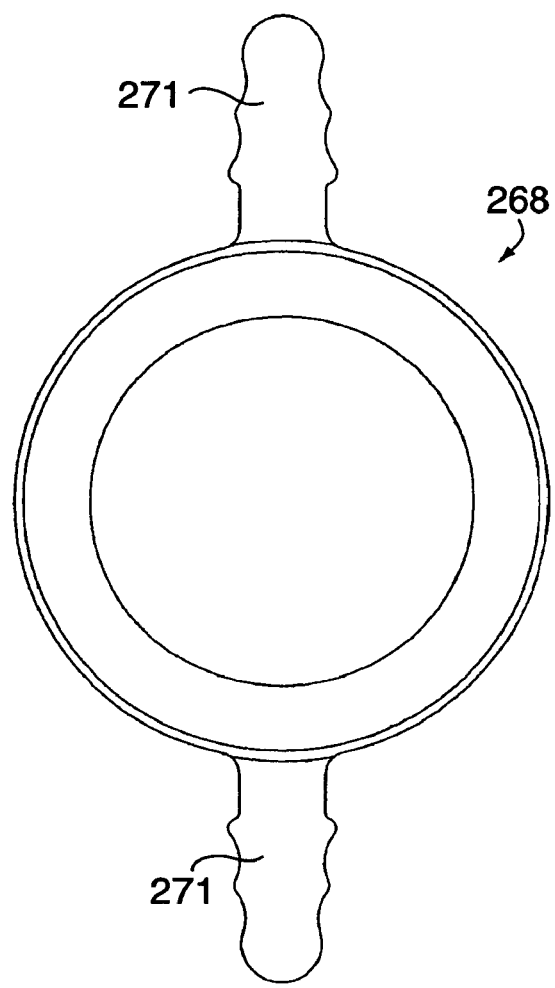
FIG. 19 is a front view of the handle member of FIG. 16.

The pressure relief cap 110 is similar to the pressure relief cap 10 except that a plug member 112 of the pressure relief cap 110 includes radially outwardly extending handles or knobs 122 disposed about a periphery thereof. As best shown in FIG. 10, for example, the plug member 112 includes four handles 122 spaced at 90 degree intervals about the periphery of the plug member. The plug member 112 can also include a projection or knob 123 disposed on a central axis A and extending axially outwardly from a front face 120 of the plug member 112 for gripping when the plug member is being coupled to or removed from a water supply outlet such as a fire hydrant. Although, four handles 122 extending radially outwardly from the periphery of the plug member 112 are illustrated by way of example, it should be understood that a fewer or greater number of handles can be employed without departing from the scope of the present invention. Moreover, other types of handles can be substituted such as, for example, those shown in FIG. 16. It should also be understood that although the plug member 112 and the seal holding member 114 are shown and described by way of example as separate components, such components can be of unitary construction without departing from the scope of the present invention.

Figure 13:
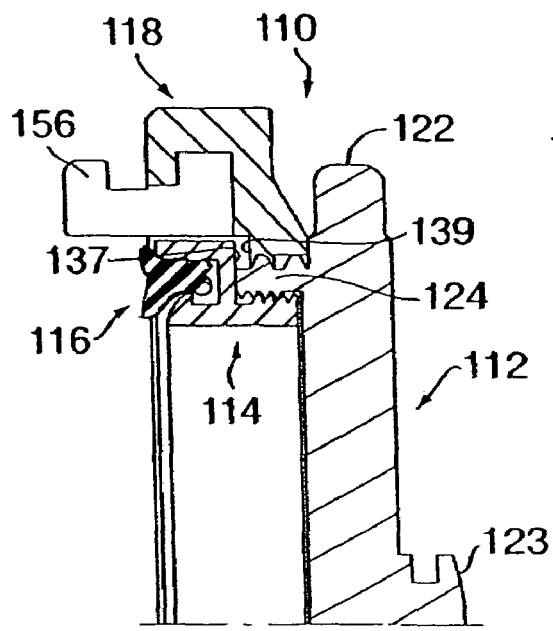
FIG. 13 is a partial cross-sectional, side elevation view of the pressure relief cap of FIG. 9 in a seal engaged position.
Figure 14:
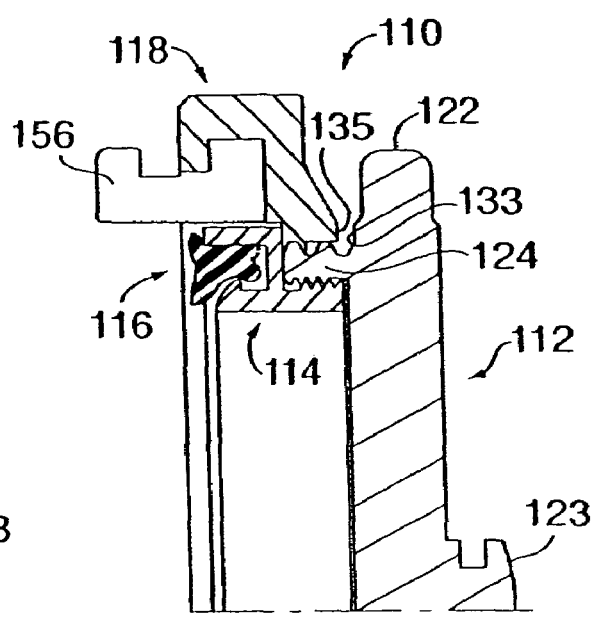
FIG. 14 is a partial cross-sectional, side elevation view of the pressure relief cap of FIG. 9 in a seal disengaged position.
Figure 15:
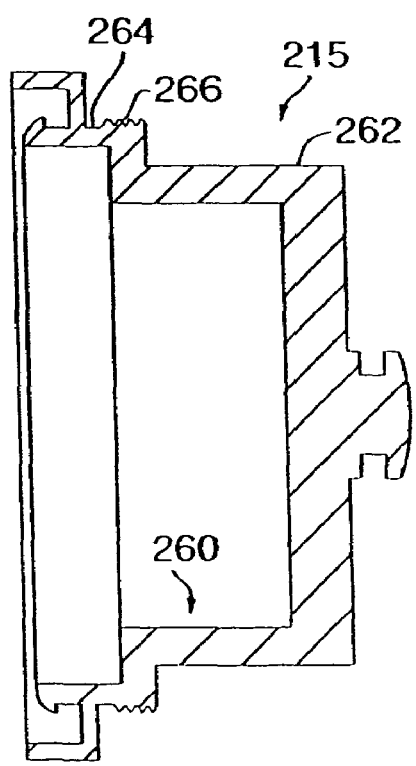
FIG. 15 is a cross-sectional, side elevation view of a combined seal holding and plug member of a pressure relief cap in accordance with a third embodiment of the present invention.
Figure 17:
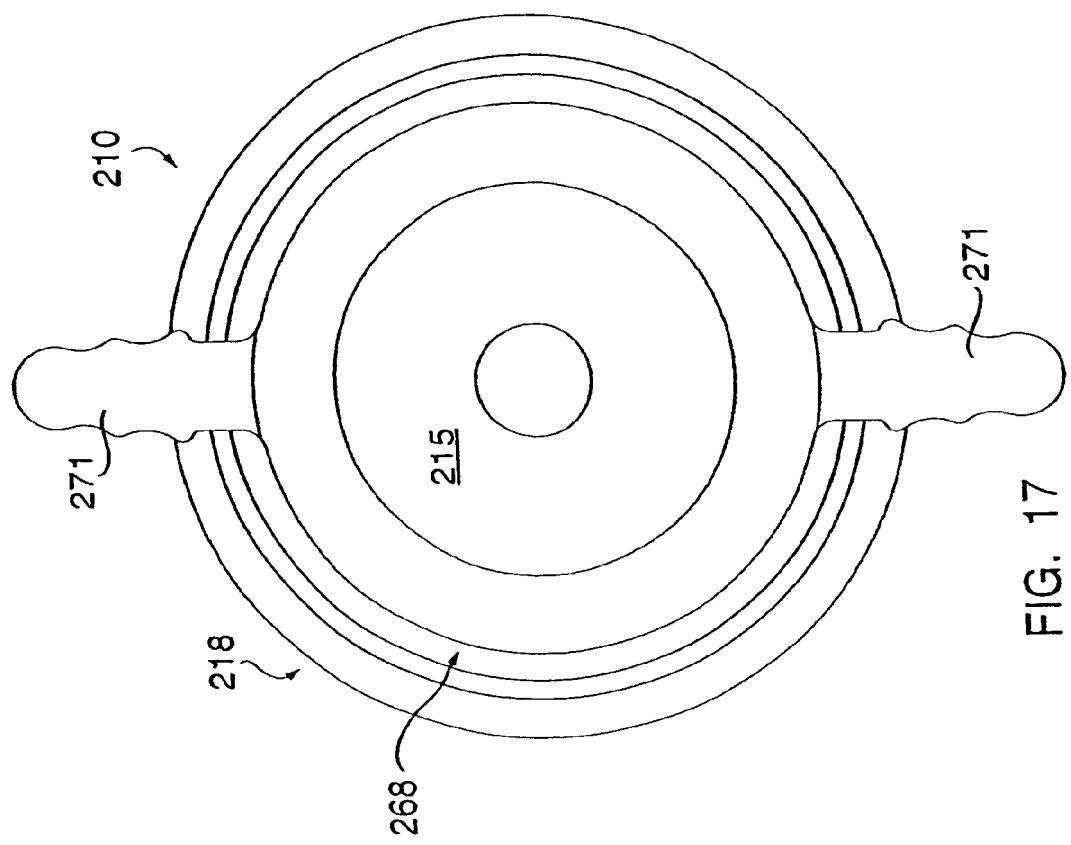
FIG. 17 is a front view of the combined seal holding and plug member of FIG. 16.

With reference to FIGS. 13 and 14, in operation the lugs 156 of the outlet attachment member 118 are axially inserted into an opening of a water supply outlet such as a hydrant (not shown). The plug member 112 is then rotated in a clockwise direction with the seal 116 in a disengaged position as shown in FIG. 14. Rotation of the plug member 112 loosely engages the lugs 156 within the opening of the hydrant and causes the outwardly facing threads 130 of the plug member to be threaded along the inwardly facing threads 152 of the outlet attachment member 118 so as to move the plug member and seal holding member 114 coupled thereto axially inwardly relative to the outlet attachment member. As the seal holding member 114 is moved axially inwardly, the seal 116 supported on the seal holding member is also moved axially inwardly from a disengaged position (shown in FIG. 14) to an engaged position (shown in FIG. 13). In the engaged position, the seal 116 is positioned for sealing engagement with a face of the outlet of a hydrant. Upon further rotation of the plug member 112 in a clockwise direction, a surface 133 of the plug member contacts a first stop surface 135 of the outlet attachment member 118 to prevent the radially outwardly facing threads 130 of the plug member from being further threaded onto the radially inwardly facing threads 152 of the outlet attachment member, thereby causing the outlet attachment member to rotate along with the plug member. The rotating outlet attachment member 118 causes the lugs 156 to move into a fully engaged position within the opening of the hydrant to thereby secure the pressure relief cap 110 to the hydrant.

When the pressure relief cap 110 is to be removed from a hydrant, the plug member 112 is rotated in a counterclockwise direction. The outwardly facing threads 130 of the plug member 112 are unthreaded along the inwardly facing threads 152 of the outlet attachment member 118 so as to move the plug member and the seal holding member 114 coupled thereto axially outwardly relative to the outlet attachment member. As the seal holding member 114 is moved axially outwardly, the seal 116 supported on the seal holding member is also moved axially outwardly from an engaged position (shown in FIG. 13) to a disengaged position (shown in FIG. 14). In the disengaged position, the seal 116 is positioned to be spaced from and no longer in sealing engagement with a face of the outlet of a hydrant. As a result, any back pressure within a hydrant is allowed to escape past the seal 116 while the lugs 156 are still in the fully engaged position within the opening of the hydrant. Because any venting takes place while the outlet attachment member 118 is secured to the outlet of the hydrant, the dangerous possibility of back pressure causing the pressure relief cap 110 to blow off the hydrant and injure someone is eliminated. Upon further rotation of the plug member 112 in a counterclockwise direction, a surface 137 of the seal holding member 114 contacts a second stop surface 139 of the outlet attachment member 118 to prevent the radially outwardly facing threads 130 of the plug member 112 from being further unthreaded along the radially inwardly facing threads 152 of the outlet attachment member, thereby causing the outlet attachment member to rotate along with the plug member. The rotating outlet attachment member 118 causes the lugs 156 to move from an engaged position within the opening of a hydrant to a disengaged position to thereby permit the pressure relief cap 110 to be safely removed from the hydrant after the back pressure has been vented.

With reference to FIGS. 15-19, a pressure relief cap in accordance with a third embodiment of the present invention is indicated generally by the reference number 210. Like elements with the pressure relief cap 10 are indicated by like reference numbers preceded by "2".

The pressure relief cap 210 is similar to the pressure relief cap 10 except that the seal holding member 14 and the plug member 12 are substituted with a combined seal holding and plug member 215 of unitary construction. Accordingly, the radially inwardly facing threads 28 of the plug member 12 and the radially outwardly facing threads 36 of the seal holding member 14 shown in the first embodiment are not necessary in the combined seal holding and plug member 215. The seal holding and plug member 215 supporting an annular seal 216 defines an annular portion 260 having an outer annular surface 262, and a stepped portion 264 extending radially outwardly from the annular portion. The stepped portion defines radially outwardly facing threads 266.

The pressure relief cap 210 further comprises an annular handle member 268 defining an inner annular surface 270 for being received over the outer annular surface 262 of the seal holding and plug member 215. The annular handle member 268 includes elongated handles 271 extending radially outwardly therefrom, and a coupling portion 272 defining radially inwardly facing threads 274 for engaging the radially outwardly facing threads 266 of the seal holding and plug member 215. The coupling portion 272 of the annular handle member 268 further defines radially outwardly facing threads 276 for engagement with radially inwardly facing threads 252 of an outlet attachment member 218.

During assembly of the pressure relief cap 210, the radially inwardly facing threads 274 of the handle member 268 are threadedly engaged with the radially outwardly facing threads 266 of the seal holding and plug member 215. Preferably, an adhesive such as, for example, LOCTITE®, is applied to one or more of the threads 274, 266 immediately prior to or during assembly in order to permanently secure the handle member 268 to the seal holding and plug member 215.

In operation the lugs 256 of the outlet attachment member 218 are axially inserted into an opening of an outlet of a water supply such as a fire hydrant (not shown). The handle member 268 is then rotated in a clockwise direction with the seal 216 in a disengaged position. Rotation of the handle member 268 loosely engages the lugs 256 within the opening of the hydrant and causes the outwardly facing threads 276 of the handle member to be threaded along the inwardly facing threads 252 of the outlet attachment member 218 so as to move the seal holding and plug member 215 coupled thereto axially inwardly relative to the outlet attachment member. As the seal holding and plug member 215 is moved axially inwardly, the seal 216 supported on the seal holding and plug member is also moved axially inwardly from a disengaged position to an engaged position (shown in FIG. 16). In the engaged position, the seal 216 is positioned for sealing engagement with a face of the outlet of a hydrant. Upon further rotation of the handle member 268 in a clockwise direction, a surface 233 of the handle member contacts a first stop surface 235 of the outlet attachment member 218 to prevent the radially outwardly facing threads 276 of the handle member from being further threaded onto the radially inwardly facing threads 252 of the outlet attachment member, thereby causing the outlet attachment member to rotate along with the handle member. The rotating outlet attachment member 218 causes the lugs 256 to move into a fully engaged position within the opening of the hydrant to thereby secure the pressure relief cap 210 to the hydrant.

When the pressure relief cap 210 is to be removed from a hydrant, the handle member 268 is rotated in a counterclockwise direction. The outwardly facing threads 276 of the handle member 268 are unthreaded along the inwardly facing threads 252 of the outlet attachment member 218 so as to move the seal holding and plug member 215 coupled thereto axially outwardly relative to the outlet attachment member. As the seal holding and plug member 215 is moved axially outwardly, the seal 216 supported on the seal holding and plug member is also moved axially outwardly from an engaged position (shown in FIG. 15) to a disengaged position. In the disengaged position, the seal 216 is positioned to be spaced from and no longer in sealing engagement with a face of the outlet of a hydrant. As a result, any back pressure within a hydrant is allowed to escape past the seal 216 while the lugs 256 are still in the fully engaged position within the opening of the hydrant. Because any venting takes place while the outlet attachment member 218 is secured to the outlet of the hydrant, the dangerous possibility of back pressure causing the pressure relief cap 210 to blow off the hydrant and injure someone is eliminated. Upon further rotation of the handle member 268 in a counterclockwise direction, a surface 237 of the seal holding and plug member 215 contacts a second stop surface 239 of the outlet attachment member 218 to prevent the radially outwardly facing threads 276 of the handle member 268 from being further unthreaded from the radially inwardly facing threads 252 of the outlet attachment member, thereby causing the outlet attachment member to rotate along with the handle member. The rotating outlet attachment member 218 causes the lugs 256 to move from an engaged position within the opening of a hydrant to a disengaged position to thereby permit the pressure relief cap 210 to be safely removed from the hydrant after the back pressure has been vented.

The handle member 268 and the seal holding and plug member 215 are shown and described as separate components by way of example, but can be of unitary construction. Further, the seal holding and plug member 215 can be substituted with separate plug member and seal holding member components. Moreover, other types of handles, such as those shown in FIGS. 2 and 10, can be substituted without departing from the scope of the present invention.

As will be recognized by those of ordinary skill in the pertinent art, numerous modifications and substitutions may be made to the above-described embodiments of the present invention without departing from the scope of the invention. Accordingly, the preceding portion of this specification is to be taken in an illustrative, as opposed to a limiting sense.

What is claimed is:

1. A pressure relief cap for an outlet of a water supply system, comprising:

an outer portion defining a front face for generally covering an outlet of a water supply, the outer portion including a seal for being urged against and sealingly engaging a periphery of the outlet and defining a first stop surface; and an inner portion including a connector for coupling and decoupling to an outlet, the inner portion being rotatably coupled to the outer portion such that upon at least partial rotation of the outer portion in a first direction relative to the inner portion the seal is moved axially inwardly relative to the inner portion from a disengaged position to an engaged position to sealingly engage a periphery of an outlet, and upon at least partial rotation of the outer portion in a second direction opposite to that of the first direction the seal is moved axially outwardly relative to the inner portion from the engaged position to the disengaged position to move the seal away from a periphery of an outlet and thereby permit any back pressure within an outlet to vent past the seal prior to decoupling the inner portion;

the inner portion further comprising a second stop surface;

wherein the inner portion and the outer portion are configured so that while the outer portion is threaded in the inner portion, the seal moves away from the second stop surface as the first stop surface moves towards engagement with the second stop surface.

2. A pressure relief cap as defined in claim 1, wherein the inner portion is threadedly coupled to the outer portion to permit rotation of the outer portion relative to the inner portion.

3. A pressure relief cap as defined in claim 2, wherein the inner portion defines radially inwardly facing threads, and the outer portion defines radially outwardly facing threads for threadedly engaging the radially inwardly facing threads of the inner portion.

4. A pressure relief cap as defined in claim 1, wherein the connector of the inner portion includes a Storz connector.

5. A pressure relief cap as defined in claim 1, wherein the outer portion includes a plug member connected to a seal holding member for supporting the seal, the plug member defining the front face, and being rotatably coupled to the inner portion for movement of the seal between the disengaged position and the engaged position.

6. A pressure relief cap as defined in claim 5, wherein the plug member is threadedly engaged with the inner portion for movement of the seal between the disengaged position and the engaged position.

7. A pressure relief cap as defined in claim 6, wherein the inner portion defines radially inwardly facing threads, and the plug member defines radially outwardly facing threads for threadedly engaging the radially inwardly facing threads of the inner portion.

8. A pressure relief cap as defined in claim 1, wherein the seal is annular, and wherein the outer portion defines an annular groove for receiving and retaining at least a portion of the seal.

9. A pressure relief cap as defined in claim 1, wherein the outer portion includes at least one projection for facilitating rotation of the outer portion relative to the inner portion.

10. A pressure relief cap as defined in claim 9, wherein the at least one projection extends outwardly from the front face of the outer portion.

11. A pressure relief cap as defined in claim 10, wherein the at least one projection is pentagon-shaped for being engaged with a correspondingly shaped tool.

12. A pressure relief cap as defined in claim 9, wherein the outer portion includes a plurality of handles disposed about a periphery of the outer portion.

13. A pressure relief cap as defined in claim 12, wherein the plurality of handles each project radially outwardly from the periphery of the outer portion.

14. A pressure relief cap as defined in claim 12, wherein the plurality of handles are each generally in the shape of a knob.

15. A pressure relief cap as defined in claim 12, wherein the plurality of handles are each generally elongated in shape.

* * * * *